United States Patent [19]
Kitahara et al.

[11] Patent Number: 5,151,333
[45] Date of Patent: Sep. 29, 1992

[54] MAGNETIC RECORDING MEDIUM COMPRISING A MAGNETIC LAYER OR BACKCOAT LAYER CONTAINING A SPECIFIED DISPERSANT

[75] Inventors: Shizuo Kitahara; Eitaro Nakamura; Yoichiro Kubo, all of Kawasaki, Japan

[73] Assignee: Nippon Zeon Co., Ltd, Tokyo, Japan

[21] Appl. No.: 562,993

[22] Filed: Aug. 6, 1990

[30] Foreign Application Priority Data

Aug. 7, 1989 [JP] Japan .................................. 1-204374

[51] Int. Cl.$^5$ .............................................. G11B 5/00
[52] U.S. Cl. ...................... 428/694; 428/403; 428/407; 428/900; 252/51.5 R; 252/62.54
[58] Field of Search ............... 252/51.5 R, 62.54; 428/900, 694, 403, 407

[56] References Cited

U.S. PATENT DOCUMENTS

| | | |
|---|---|---|
| 2,897,182 | 7/1959 | de Benneville et al. ............ 260/85.5 |
| 3,205,092 | 9/1965 | Rosenberg ............................ 428/480 |
| 3,483,141 | 12/1969 | Litt et al. . |
| 3,502,627 | 3/1970 | Dupont ................................ 260/86.1 |
| 3,516,944 | 6/1970 | Litt et al. ........................ 252/51.5 R |
| 3,531,427 | 9/1970 | Kervenski et al. . |
| 3,536,658 | 10/1970 | Wich . |
| 3,644,264 | 2/1972 | Hyde . |
| 4,189,582 | 2/1980 | Hoch et al. ............................ 546/37 |
| 4,637,963 | 1/1987 | Nishimatsu et al. ................ 428/694 |
| 4,702,854 | 10/1987 | Snyder, Jr. et al. ............ 252/51.5 R |
| 4,734,330 | 3/1988 | Oiyama et al. .................... 428/411.1 |

FOREIGN PATENT DOCUMENTS 1043638 12/1978 Canada .

Primary Examiner—Paul J. Thibodeau
Assistant Examiner—Stevan A. Resan
Attorney, Agent, or Firm—Armstrong & Kubovcik

[57] ABSTRACT

Disclosed is a magnetic recording medium comprising a non-magnetic support and a magnetic layer composed mainly of a ferromagnetic powder and a binder, which is formed on one surface of the support, and an optional backcoat layer composed mainly of a non-magnetic powder and a binder, which is formed on the other surface of the support. At least one of the magnetic layer and the backcoat layer contains a compound having at least one $>\!\!C\!\!=\!\!N^{\oplus}\!\!<$ bond in the molecule. When preparing the magnetic recording medium, the magnetic powder or non-magnetic powder may be surface-treated with the $>\!\!C\!\!=\!\!N^{\oplus}\!\!<$ group-containing compound.

10 Claims, No Drawings

MAGNETIC RECORDING MEDIUM COMPRISING A MAGNETIC LAYER OR BACKCOAT LAYER CONTAINING A SPECIFIED DISPERSANT

BACKGROUND OF THE INVENTION (1) Field of the Invention

This invention relates to a magnetic recording medium such as a magnetic tape. More particularly, it relates to a magnetic recording medium having improved magnetic characteristics and durability.

(2) Description of the Related Art

A magnetic recording medium such as a magnetic tape or a magnetic card is generally made by coating a magnetic coating solution comprising a magnetic powder and a binder as a magnetic layer on a substrate such as a polyester film. Recently, to improve the S/N ratio and the recording density by increasing the coercive force and maximum saturation magnetization, a finely divided magnetic powder having a large specific surface area has been used as the magnetic powder, and either iron oxide magnetic powders or metallic iron magnetic powders having a specific surface area such as 60 $m^2/g$, a major axis such as 0.1 $\mu m$ and a minor axis such as 0.01 $\mu m$ are used.

When a magnetic coating solution is prepared by using a magnetic powder as mentioned above together with a hydroxyl group-containing resin binder generally used for magnetic layers, such as nitrocellulose or a vinyl chloride/vinyl acetate/vinyl alcohol copolymer, the amount of the magnetic powder adsorbed in the resin binder is increase to thereby increase the viscosity, with the result that the dispersion of the magnetic powder becomes poor. Accordingly, when this coating solution is coated on a non-magnetic support to form a magnetic layer, the orientation of the magnetic powder is poor and the dispersion of the magnetic powder in the magnetic layer is unsatisfactory, and the magnetic characteristics and electro-magnetic conversion characteristics of the magnetic recording medium become poor. This tendency is conspicuous as the size of the magnetic powder is made finer to improve the recording density, and the specific surface area is increased, for example, to 30 $m^2/g$ or more.

As the means for improving the dispersibility of the magnetic powder in a magnetic coating solution, there has been adopted a method in which various surface active agents or fatty acids are incorporated as the dispersant in magnetic coating solutions, or a method in which the magnetic powder is surface-treated with surface active agents or fatty acids (see, for example, Japanese Unexamined Patent Publication No. 58-102504). Furthermore, there has been proposed a method in which the magnetic powder is surface-treated with a silane coupling agent or a titanium coupling agent (see, for example, Japanese Unexamined Patent Publication No. 55-125539 and Japanese Unexamined Patent Publication No. 56-58135).

According to the method in which a dispersant is added into a magnetic coating solution, however, to obtain a required dispersing effect, a large amount of the dispersant must be used, and therefore, problems such as a reduction of the coating strength of the magnetic layer and a bleeding of the dispersant to the surface of the magnetic layer, causing a reduction of the commercial value, arise.

Moreover, according to the method in which the magnetic powder is surface-treated with a fatty acid or a surface active agent, since the surfaces of particles of the magnetic powder are made hydrophobic, the orientation is greatly improved, but since the amount of the magnetic powder adsorbed in the binder is too small, the stability of the coating solution is lowered and the strength of the formed magnetic layer is reduced or the moisture resistance becomes poor, and a reduction of the running property under high-temperature and high-humidity conditions or the running durability under usual temperature and humidity conditions often occurs.

According to the method in which the magnetic powder is surface-treated with a coupling agent, an improvement of the durability of the magnetic layer due to the improved wettability between the magnetic powder and the binder is expected. In practice, however, the reaction between the coupling agent and the magnetic powder is poor or the dispersibility of the magnetic powder becomes unsatisfactory, and a reduction of the electro-magnetic conversion characteristics often occurs.

Furthermore, to prevent an irregular winding and improve the antistatic and running properties, there is widely adopted a method in which a backcoat layer composed of a non-magnetic powder, such as electro-conductive carbon black, incorporated into a binder is formed on the surface of the non-magnetic support where the magnetic layer is not formed. Especially, for a vacuum evaporation tape where a magnetic layer is formed by directly depositing a ferromagnetic metal on the non-magnetic support by vacuum evaporation or the like, this backcoat layer is indispensable.

In this backcoat layer, the non-magnetic powder-dispersing property of the binder and the properties of the formed coating are important factors having an influence on the durability and running property. For example, if a binder customarily widely used, for example, a vinyl chloride/vinyl acetate/vinyl alcohol copolymer, nitrocellulose, a polyurethane or a polyester is directly used, the dispersibility is poor, and therefore, the coating layer is scratched by a pinch roller or a guide pin and the powder falls off after many runs.

A method in which a surface active agent is used as the dispersant for the backcoat layer is considered effective as a means for further improving the durability or running property, but since the surface active agent is present in the backcoat layer, there is a risk that problems concerning the mechanical strength and durability will arise, for example, a falling off of the powder and blooming with a lapse of time.

SUMMARY OF THE INVENTION

An object of the present invention is to provide a magnetic recording medium in which a magnetic powder has a good dispersibility and a good orientation and which has excellent magnetic characteristics and electromagnetic conversion characteristics, and further has excellent running properties and durability.

In one aspect of the present invention, there is provided a magnetic recording medium which comprises a non-magnetic support and, formed thereon, a magnetic layer composed mainly of a ferromagnetic powder and a binder, wherein at least 0.1 part by weight, per 100 parts by weight of the ferromagnetic powder, of a compound having at least one $>C=N^{\oplus}<$ bond in the molecule is contained in the magnetic layer.

Furthermore, in another aspect of the present invention, there is provided a magnetic recording medium which comprises a non-magnetic support, a magnetic layer composed mainly of a ferromagnetic powder and a binder, which is formed on one surface of the support, and a backcoat layer composed mainly of a non-magnetic powder and a binder, which is formed on the other surface of the support, wherein at least 0.1 part by weight, per 100 parts by weight of the ferromagnetic powder, of a compound having at least one $>C=N^{\oplus}<$ bond in the molecule is contained in at least one of the magnetic layer and the backcoat layer.

DESCRIPTION OF THE PREFERRED EMBODIMENTS

The compound having at least one $>C=N^{\oplus}<$ in the molecule, which is used in the present invention, includes low-molecular-weight organic compounds and high-molecular-weight polymers, which have this bond in a hetero ring thereof, which are represented by the following formulae (Ia) through (Vb). This hetero ring can be located either in the molecule chain or at the terminal of the molecule chain.

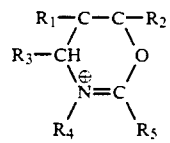  (Ia)

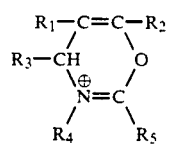  (Ib)

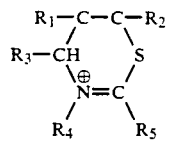  (IIa)

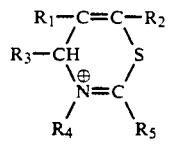  (IIb)

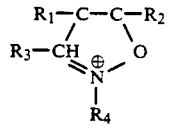  (IIIa)

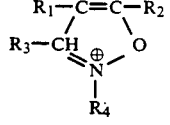  (IIIb)

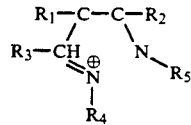  (IVa)

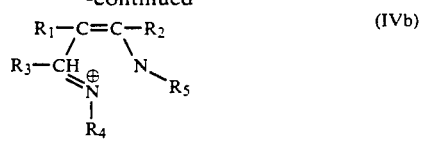  (IVb)

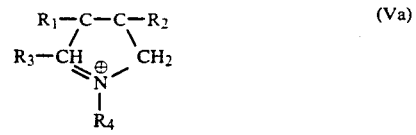  (Va)

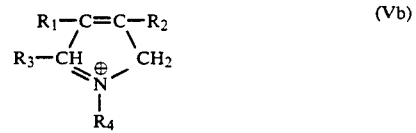  (Vb)

In the above formulae, $R_1$ and $R_2$ represent the main chain of each compound, a hydrogen atom or a hydrocarbon group having not more than 6 carbon atoms; $R_3$ to $R_5$ may be the same or different and each represents a hydrocarbon group at least part of which may be substituted by a substituent such as a halogen atom, a nitro group, an epoxy group, a carboxyl group or a hydroxyether group.

The compound having at least one bond $>C=N^{\oplus}>$ in the molecule, which is used in the present invention (hereinafter referred to as "the dispersant of the present invention"), is prepared by using a low-molecular-weight compound or high-molecular-weight polymer, which has at least one carbon-to-carbon double bond (—C=C—) or triple bond (—C≡C—) in the molecule as the starting material according to a process described below.

As the starting material, there can be mentioned α-olefins having a —C=C— bond, such as 1-heptene, 1-octene, 1-nonene, 1-decene, 1-dodecene, 1-tridecene, 1-tetradecene, 1-hexadecene, 1-eicosene, 2-methyl-1-undecene, tricosene, 2,4,4-trimethyl-2-pentene and mixtures of two or more these α-olefins; unsaturated alcohols such as phenylvinylcarbinol, cynnamyl alcohol, trans-1,4-diphenyl-2-butene-1,4-diol, tetradecenol, hexadecenol and oleyl alcohol; low-molecular-weight polymers and oligomers having a —C=C— bond at the terminal of the molecule, such as polyethylene, polypropylene, polybutene, polyisobutylene, α-olefin oligomers and macromers (for example, polyethylene glycol diacrylate, polystyrene methacrylate and polystyrene acrylate); polymers having a —C=C— bond in the molecule (including oligomers), such as homopolymers and copolymers of conjugated dienes such as butadiene and isoprene, copolymers of conjugated dienes and monomers copolymerizable therewith (for example, aromatic vinyl compounds such as styrene, unsaturated nitrile compounds such as acrylonitrile, unsaturated carboxylic acids such as acrylic acid, methacrylic acid, maleic acid and maleic anhydride, and esters of unsaturated carboxylic acids), and homopolymers and copolymers of dicyclopentadiene and ethylidenenorbornene; and organic compounds having a —C≡C— bond, such as 1-decyne, 3,3-dimethyl-1-butyne, heptyne, hexyne, 1,8-nonadiyne and octyne.

The dispersant used in the present invention can be prepared by using unsaturated compounds as mentioned above according to processes described below.

(1) A process comprising reacting the above-mentioned starting unsaturated compound with an organic compound (I) represented by the general formula $R_6$—CH=N—$R_7$ in which $R_6$ and $R_7$ represent an organic atomic group, and an organic acid halide in the presence of a Lewis acid.

In the organic compound (I), $R_6$ and $R_7$ represent an aliphatic, alicyclic or aromatic residue, which may have an alkoxy group, a cyano group, a carboxyl group, a dialkylamino group or other atomic group. As specific examples, there can be mentioned benzylidenemethylamine, benzylidenebutylamine, benzylideneaniline, benzylidenecyclohexylamine, propylideneaniline, ethoxybenzylidenebutylamine, 4-carboxymethoxybenzylidenebutylaniline, benzylidene-4-cyanoaniline and dimethylbenzylidenebutylaniline. As specific examples of the organic acid halide, there can be mentioned acetyl chloride, acetyl bromide, benzoyl chloride, acrylic acid chloride, carbomethoxybenzoyl chloride, cinnamic acid chloride and methacrylic acid chloride. As the Lewis acid, there can be mentioned $BF_3$, $BF_3O(C_2H_5)_2$, $AlCl_3$, $TiCl_4$, $SnCl_5$, $SbCl_5$ and $AgBF_4$.

The reaction conditions are not particularly critical, but generally the reaction is carried out at 20° to 80° C. for about 1 to about 2 hours in an inert solvent such as benzene, toluene or cyclohexane. The organic compound (I) and the organic acid halide are generally used in amounts of about 1 to about 1.5 moles per mole of the unsaturated compound, and the Lewis acid is used in an amount of about 0.1 to about 1 mole per mole of the organic acid halide. Where the unsaturated compound is a polymer, the organic compound (I) and organic acid halide are used in amounts of about 0.1 to about 30 parts by weight per 100 parts by weight of the polymer.

(2) A process comprising reacting the above-mentioned starting unsaturated compound with an N-hydroxymethylamide compound (N-methylol compound) in the presence of a Friedel-Crafts catalyst and, if necessary, further reacting the reaction product with an alkyl halide or dimethyl sulfate to effect N-alkylation.

The N-hydroxymethylamide compound is a reaction product between an amide compound and an aldehyde compound. Aliphatic and aromatic aldehydes such as formalin, butyroaldehyde, valeroaldehyde and benzaldehyde can be used as the aldehyde compound. As the amide compound, there can be mentioned acetamide, benzamide, methoxybenzamide, nitrobenzamide, N-methylbenzamide, butyramide, phthalamide and glutaramide. A copolymer comprising N-methylolacrylamide monomer units as one component can be used as the N-hydroxymethylamide compound.

As the alkyl halide used in the present invention, there can be mentioned benzyl bromide, benzyl chloride, bromohexane, bromopropane, 2-chloroethyl ether, chloromethyl ether and chloropentane.

Generally known Friedel-Crafts catalysts can be used. Typical instances are halogen compounds of metals and metalloids. For example, there can be mentioned halogen compounds, organic halogen compounds and complexes of elements such as B, Al, Si, P, Ti, V, Fe, Zn, Mo, Sn, Sb, Te and W and oxygen-element compounds such as PO, $SO_2$ and VO. As specific examples, there can be mentioned $BF_3$, $BF_3O(C_2H_5)_2$, $BCl_3$, $AlCl_3$, $TiCl_4$, $SnCl_4$, $FeCl_3$, $WCl_6$, $POCl_3$ and $(C_2H_5)_2Al$. The reaction conditions are not particularly critical [the details of this reaction are described in C. Giordano et al., SYNTHESIS, 92 (1971)].

(3) A process comprises reacting the compound having an unsaturated bond with nitrile oxide, nitrile imine or nitrile ylide to effect 1,3-dipole addition reaction and further reacting the reaction product with an alkyl halide or dimethyl sulfate to effect N-alkylation [Huisgen, Angew. Chem., 75, 604 (1963)].

The reaction of introduction of an isooxazoline ring by using nitrile oxide is carried out according to the teaching of Tada, Numata et al., Journal of the Society of Rubber Industry, Japan, 43, 966 (1970) and the reaction of introduction of a pyrazoline ring by using nitrile imine is carried out according to the teaching of Caraculacu et al., Polymer Letter, 6, 451 (1968).

(4) A process comprising reacting the compound having a carbon-to-carbon unsaturated bond with a halohydroximino compound in the presence of a dehydrochlorinating agent such as anhydrous sodium carbonate, and further reacting the reaction product with an alkyl halide or dimethyl sulfate to effect N-methylation.

The halohydroximino compound can be obtained by reacting an alpha-haloaceto compound described in T. L. Gilchrist et al., J. C. S. Chem. Commun., 1090 (1979) with hydroxylamine hydrochloride, or by reacting a vinyl compound such as acrolein, an acrylic acid ester or alpha-methylstyrene described in K. A. Ogloblin et al., J. Org. Chem., U. S. S. R. 1, 1370 (1965) with nitrosil chloride.

The synthesis of a compound having an oxazine structure by the reaction of an olefin with a halohydroximino compound shown in synthesis examples hereinbelow is carried out in accordance with the method of T. L. Gilchrist et at., J. Chem. Soc. Perkin Trans., I, 1275 (1983).

The synthesis of compounds having an oxazine structure is also described in detail in H. E. Zaugg et al., Synthesis, 85 (1984), Synthesis 182 (1984) and Synthesis 182 (1984).

The compounds having a heterocyclic structure, which are obtained by the above processes may be partly substituted by a substitutent such as a halogen atom, a nitro group, an epoxy group, a carboxyl group or a hydroxy ether group.

Furthermore, there can be adopted a process comprising polymerizing a 2-vinyl-2-oxazoline compound or a 2-vinyl-2-oxazine alone or with other copolymerizable monomer and converting the nitrogen atom of the hetero ring in the obtained polymer to a quaternary ammonium group by alkylation or the like, and a process comprising polymerizing a 2-vinyl-2-oxazolium salt or a 2-vinyl-2-oxazinium salt alone or with other copolymerizable monomer.

The dispersant of the present invention prepared according to the above-mentioned processes is incorporated and dispersed in an organic solvent together with a magnetic powder, a lubricant, an abrasive, an antistatic agent, a binder and a curing agent to form a magnetic coating solution. The magnetic coating solution is coated on a non-magnetic support and after the magnetic field orientation (including the random orientation), the drying treatment, the surface-smoothening treatment, the curing treatment and, if necessary, the surface-polishing treatment are carried out. Then, cutting and assembling are carried out to obtain a magnetic recording medium.

The amount of the dispersant used in the present invention is at least 0.1 part by weight, preferably 0.5 to 30 parts by weight, per 100 parts by weight of the magnetic powder. Where the dispersant used in the present invention has a low molecular weight of less than 1,000, the dispersant is preferably used in an amount adopted for a surface active agent customarily used as the dispersant, such as a fatty acid or lecithin, that is, 0.5 to 5 parts by weight. Where the dispersant used in the present invention has a high molecular weight of at least 10,000, the dispersant also functions as the binder, and therefore, the amount is preferably 5 to 30 parts by weight.

As the magnetic powder used for the magnetic recording medium of the present invention, there can be mentioned oxide type magnetic powders such as $\gamma$-$Fe_2O_3$, $Fe_3O_4$, intermediate oxides thereof, Co-containing $\gamma$-$Fe_2O_3$, $CrO_2$, $Ba^-$, $Sr^-$ and Pb-ferrite; carbide type magnetic powders such as an intermediate carbide of iron oxide, $Fe_5C_2$, $Fe_2C$ and FeC; and metal magnetic powders such as Fe, Co, Ni, alloys thereof and alloys of these metals with other metals. The magnetic powder having a specific surface area of at least 30 $m^2/g$ determined according to the BET adsorption method is preferably used.

In the present invention, the magnetic powder which has been preliminarily surface-treated with the dispersant used in the present invention can be used. The surface treatment method is not particularly critical, but a method can be adopted in which the dispersant of the present invention is dissolved in an inert solvent and the magnetic powder is immersed in the solution, a method in which the magnetic powder is mixed with a suspension of the dispersant of the present invention in an insoluble medium such as water, and a method in which the magnetic powder in the state wetted with water is mixed with the dispersant of the present invention or a suspension or solution thereof.

As examples of the lubricant, there can be mentioned fatty acids having 10 to 22 carbon atoms, such as caprylic acid, capric acid, lauric acid, myristic acid, palmitic acid, stearic acid, oleic acid, elaidic acid, linoleic acid, linolenic acid and stearolic acid, higher alcohols having 10 to 22 carbon atoms, fatty acid esters comprising a monobasic fatty acid having 12 to 20 carbon atoms and a monohydric or polyhydric alcohol having 3 to 20 carbon atoms, such as butyl stearate and sorbitol oleate, and known lubricants and known lubricants for plastics such as mineral oils, animal and vegetable oils, low-molecular-weight $\alpha$-olefin polymers and other low-molecular-weight olefin polymers, silicone oils, graphite fine powder, molybdenum disulfide fine powder and Teflon fine powder. These lubricants can be used in the form of a mixture of two or more thereof. The amount of the lubricant added can be determined according to the known technique.

As examples of the abrasive, there can be mentioned inorganic powders such as aluminum oxide, titanium oxide (TiO and $TiO_2$), silicon oxide (SiO and $SiO_2$), silicon nitride, chromium oxide and boron carbide, and organic powders such as a benzoquanamine resin powder, a melamine resin powder and a phthalocyanine compound powder. The average particle diameter of the abrasive is generally 0.1 to 1.0 $\mu$m.

The amount of the abrasive used is generally 0.5 to 10 parts by weight per 100 parts by weight of the magnetic powder.

As examples of the antistatic agent, there can be mentioned electroconductive powders such as graphite, carbon black, a tin oxide/antimony oxide compound, a tin oxide/titanium oxide/antimony oxide compound and a carbon black-grafted polymer; natural surface active agents such as saponin; nonionic surface active agents such as an alkylene oxide type surface active agent, a glycerol type surface active agent and a glycidol type surface active agent; cationic surface active agents such as higher alkylamines, quaternary pyridinium compounds, other heterocyclic compounds, phosphonium compounds and sulfonium compounds; anionic surface active agents containing a carboxylic acid group, a sulfonic acid group, phosphoric acid group, a sulfuric acid ester group, a phosphoric acid ester group or other acidic group; and amphoteric surface active agents such as amino acids, aminosulfonic acids, and sulfuric acid and phosphoric acid esters of aminoalcohols. These antistatic agents can be used alone or in the form of a mixture of two or more thereof.

The amount of the antistatic agent used is generally 0.5 to 10 parts by weight per 100 parts by weight of the magnetic powder.

Note, some of the above-mentioned antistatic agents and dispersants described below do not shown only one action, but one compound shows a plurality of actions, for example, an action of a lubricant and an action of an antistatic agent.

Accordingly, in the above-mentioned classification, only the main action is explained and the actions of the agents are not limited to those mentioned in the above classification.

Binders customarily used for magnetic recording media, for example, thermoplastic resins, thermosetting resins, reaction type resins, electron beam-curable resins and mixtures thereof can be used as the binder in the present invention.

As the thermoplastic resin, there can be mentioned, for example, a vinyl chloride/vinyl acetate copolymer, a vinyl chloride/vinylidene chloride copolymer, a vinyl chloride/acrylonitrile copolymer, an acrylic acid ester/acrylonitrile copolymer, an acrylic acid ester/vinylidene chloride copolymer, methacrylic acid ester/vinylidene chloride copolymer, a methacrylic acid ester/ethylene copolymer, a urethane elastomer, polyvinyl fluoride, a vinylidene chloride/acrylonitrile copolymer, an acrylonitrile/butadiene copolymer, a polyamide resin, polyvinyl butyral, a cellulose derivative such as cellulose acetate butyrate, cellulose diacetate, cellulose triacetate, cellulose propionate or nitrocellulose, a styrene/butadiene copolymer, a polyester resin, a chlorovinyl ether/acrylic acid ester copolymer, an amino resin and a synthetic rubber. These thermoplastic resins can be used alone or a mixture of two or more thereof.

As the binder, a thermoplastic resin comprising a component containing a hydroxyl group or an epoxy group is preferably used, and from the viewpoint of the dispersion stability of the coating solution, a thermoplastic resin containing a hydrophilic group such as $-SO_3M$, $-SO_4M$, $-COOM$, $-PO_4N_2$ or a quaternary ammonium base (in which M represents a hydrogen atom, an alkali metal or ammonium) is preferably used.

As the thermosetting resin or the reaction type resin, there can be mentioned, for example, a phenolic resin, an epoxy resin, a polyurethane type curable resin, a urea resin, a melamine resin, an alkyd resin, a silicone resin, an acrylic reactive resin, a mixture of a high-molecular-weight polyester resin and an isocyanate prepolymer, a mixture of a copolymer of a methacrylic acid salt and a diisocyanate prepolymer, a mixture of a polyester polyol and a polyisocyanate, a urea-formaldehyde resin, a low-molecular-weight glycol/high-molecular-weight diol/triphenylmethane triisocyanate mixture, and a polyamine resin. These resins can be used alone or in the form of a mixture of two or more thereof.

As the electron beam-curable resin, there can be mentioned unsaturated polymers such as a double bond-added vinyl chloride resin (see Japanese Unexamined Patent Publication No. 61-89207 and Japanese Unexamined Patent Publication No. 61-106605), unsaturated prepolymers such as a maleic anhydride type prepolymer, a urethane-acrylic type prepolymer, an epoxy-acrylic type prepolymer, a polyester-acrylic type prepolymer, a polyether-acrylic type prepolymer, a polyurethaneacrylic type prepolymer and a polyamide-acrylic type prepolymer; and polyfunctional monomers such as an ether-acrylic type monomer, a urethane acrylic type monomer, an epoxy-acrylic type monomer, a phosphoric acid ester-acrylic type monomer, an allyl type monomer and a hydrocarbon type monomer.

These resins can be used alone or in the form of a mixture of two or more thereof.

As the curing agent, there can be used, for example, polyisocyanate compounds such as tolylene diisocyanate, 4,4'-diphenylmethane diisocyanate, naphthylene diisocyanate, hexamethylene diisocyanate, cyclohexane diisocyanate, adducts of these polyisocyanate compounds and trihydric polyols, heptamers of diisocyanates, an adduct of 3 moles of tolylene diisocyanate and 1 mole of trimethylol propane, an adduct of 3 moles of metaxylylene diisocyanate and 1 mole of trimethylol propane, and a heptamer of tolylene diisocyanate; amine compounds such as triethylene tetraamine, tetraethylene pentamine, N-aminoethylpiperazine, xylylene diamine, adducts of these amines and epoxy compounds, Michael addition reaction products of acrylonitrile and acrylic acid esters, urea compounds of isocyanates, and polyamideamines formed by condensation with a polycarboxylic acid; and polythiols such as dibutylaminothiol-S-triazine, pentaerythritol tetrathioglycolate, and trimethylolpropane trithioglycolate.

The binder (a curing agent as mentioned above is included when the curing agent is used for the binder) is generally used in an amount of 10 to 40 parts by weight per 100 parts by weight of the magnetic powder. If the amount of the binder is too large, this results in a decrease of the amount of the ferromagnetic powder and the recording density of the magnetic recording medium is often reduced. If the amount of the binder is too small, the strength of the magnetic layer is reduced.

Of course, where a polymer having a molecular weight of at least 10,000 is used as the dispersant of the present invention, since this polymer per se acts as the binder, the polymer forms a binder composition together with the binder separately added.

In the magnetic recording medium, not only the magnetic powder but also the powder contained in the magnetic layer is sufficiently dispersed by the dispersant of the present invention, and therefore, a conventional dispersant heretofore used for the production of magnetic recording media need not be used. Nevertheless, the use of such a dispersant is not excluded and such a dispersant can be used in combination with the dispersant of the present invention.

As examples of the conventional dispersant, there can be mentioned fatty acids having 10 to 22 carbon atoms, metal soaps composed of these fatty acids and alkali metals such as lithium, sodium and potassium or alkaline earth metals such as magnesium, calcium and barium, esters of these fatty acids, compounds formed by substituting some or all of hydrogen atoms of these fatty acids with fluorine atoms, amides of these fatty acids, aliphatic amines, higher alcohols, polyalkylene oxide alkyl-phosphoric acid esters, alkylphosphoric acid esters, alkyl-boric acid esters, sarcosinates, alkyl ether esters, trialkyl polyolefinoxy quaternary ammonium salts and lecithin.

The dispersant of the present invention can improve the solvent dispersibility of inorganic powders such as electroconductive carbon black, hematite, mica, silica gel, magnesium oxide, zinc sulfide, tungsten carbide, boron nitride, starch, zinc oxide, kaolin, talc, clay, lead sulfate, barium carbonate, calcium carbonate, magnesium carbonate, boehmite ($\gamma$-$Al_2O_3$·$H_2O$), alumina, tungsten sulfide and titanium oxide. When the dispersant of the present invention is used in a coating solution for a backcoat layer, which solution is prepared by mixing an inorganic powder as mentioned above appropriately with a binder, a lubricant, an abrasive, an antistatic agent and an anticorrosive agent and dispersing the mixture into an organic solvent, a backcoat layer exhibiting a good dispersing property can be obtained, and this backcoat layer is dense and has a good durability. Accordingly, a magnetic recording medium having a good durability and running properties can be obtained.

Carbon black or other inorganic powder contained in the backcoat layer can be preliminarily treated with the dispersant of the present invention and a coating solution can be prepared by incorporating these pre-treated components with other additives. Alternatively, carbon black and the above-mentioned inorganic powder can be mixed with the dispersant of the present invention together with the additives to form a coating solution. Binders, lubricants, abrasives and antistatic agents mentioned above with respect to the magnetic coating solution can be used for the backcoat layer coating solution.

As the organic solvent used for the preparation of the coating solution for the backcoat layer, as in the case of the magnetic coating solution, there can be used for example, ketone type solvents such as acetone, methyl ethyl ketone, methyl isobutyl ketone and cyclohexanone; ester type solvents such as methyl acetate, ethyl acetate, butyl acetate, ethyl butyrate and glycol monoethyl ether acetate; glycol ether type solvents such as glycol dimethyl ether, glycol monoethyl ether and dioxane; aromatic hydrocarbon solvents such as benzene, toluene and xylene; and aliphatic hydrocarbon solvents such as hexane and heptane.

The backcoat layer coating solution is coated on the surface of the non-magnetic support on the side opposite to the surface where the magnetic layer is formed.

Any materials customarily used for magnetic recording media of this type can be used as the material of the non-magnetic support. For example, there can be mentioned polyesters such as polyethylene terephthalate, polyolefins such as polyethylene and polypropylene, cellulose derivatives such as cellulose triacetate, cellulose diacetate and cellulose acetate butyrate, vinyl resins such as polyvinyl chloride and polyvinylidene chloride, plastics such as polycarbonates, polyimides, polyamides and polyamide-imides, paper, metals such as aluminum and copper, light alloys such as an aluminum alloy and a titanium alloy, ceramics and single crystal silicon. The non-magnetic support can be in the form of any of a film, a tape, a sheet, a disk, a card and a drum.

The dispersant of the present invention can be strongly adsorbed on inorganic powders such as a magnetic powder and an abrasive or carbon black, and improves the dispersibility of these powders in an organic solvent. It is considered that the reaction between a functional group such as a hydroxyl group, present on the surfaces of these powders, and the $>C=N^{\oplus}<$ bond participates in attainment of this effect.

Therefore, according to the present invention, a magnetic coating solution or backcoat coating solution having a low viscosity and a good stability, in which a magnetic powder or carbon black is highly dispersed, can be obtained, and a magnetic layer or backcoat layer formed by coating this coating solution on a non-magnetic support has a highly filled structure and an excellent surface smoothness. As the result, a magnetic recording medium having good magnetic characteristics and electro-magnetic conversion characteristics and good durability and running properties can be obtained.

If the dispersant of the present invention is incorporated into a basecoat coating solution for forming a basecoat layer between a magnetic layer formed of an electroconductive coating solution having carbon black dispersed therein and a non-magnetic support, the denseness of the basecoat layer can be improved.

The present invention will now be described in detail with reference to the following examples. In the examples and comparative examples, all of "parts" and "%" are by weight unless otherwise indicated.

Dispersant Synthesis Example 1

A reaction vessel equipped with a stirrer, an internal heating device, a vapor condenser and a liquid-solid feed inlet was charged with 1 mole of an olefin shown in Table 1 and 300 ml of benzene, and the mixture was heated to 60° C. with stirring. Then, 1 mole of each of reagents (1) and (2) shown in Table 1 were added and a reaction was carried out for about 1 hour. Methanol was added to the reaction mixture to stop the reaction. The reaction solvent and unreacted materials were removed by distillation at 90° C. under 30 mmHg, whereby foreign volatile substances were removed.

The obtained dispersants A, B and C were used in examples given hereinafter.

The presence of $>C=N^{\oplus}<$ was determined by an ultraviolet light absorption spectrum at a wavelength of 310 to 315 nm, and an absorption spectrum of visible light at 360 nm. The presence of an oxazolinium ion was determined by an absorption spectrum of ultraviolet light at 310 nm and by peaks of 2.37, 2.47, 4.00, 4.43 and 7.45 ppm in an NMR spectrum.

TABLE 1

| Dispersant | A | B | C |
|---|---|---|---|
| Compound having an unsaturated bond | α-olefin*1 $CH_3+CH_2)_{14}-CH=CH_2$ | 1-eicosene | oleyl alcohol |
| Reagent (1) | benzylidenebutylamine and acetyl chloride | hydroxyl-benzamide | beta-bromo-hydroximino-ethylbenzene |
| Reagent (2) | tin tetrachloride | $BF_3$-ether complex | anhydrous sodium carbonate |

Note
*1DIALENE 168: a $C_{13}$–$C_{18}$ α-olefin mixture, a product of Mitsubishi Kasei Corp.

Dispersant Synthesis Example 2

In 500 ml of cyclohexane (for dispersants D and E) or benzene (for dispersants F and G) was dissolved 100 g of an oligomer shown in Table 2, and the solution was charged in a reaction vessel equipped with a stirrer, an internal heating device, a vapor condenser and a liquid-solid feed inlet. The mixture was heated to 60° C. with stirring. One mole of each of reagent (1) and reagent (2) shown in Table 2 were added to the mixture and reaction was carried out for about 1 hour. In a run for dispersant E and runs for dispersants F and G, 1.2 moles and 2.0 moles, respectively, of reagent (3) shown in Table 2 were further added and reaction was carried out. A small amount of methanol was added to the reaction mixture to stop the reaction and 1 l of acetone/methanol (50/50) was poured into the reaction mixture to completely coagulate the product. The obtained solid product was dried in a vacuum drier.

The obtained dispersants D through G were used in examples given hereinafter.

TABLE 2

| Dispersant | D | E | F | G |
|---|---|---|---|---|
| Compound having an unsaturated bond at the ends | liquid polyisoprene (Mw = 4,000) | ethylene/propylene/diene copolymer (Mw = 100,000) | polyethylene glycol dimethacrylate *2  | polystyrylethyl methacrylate *3 $C_4H_9+CH_2-CH)_nCH_2CH_2OOCC=CH_2$  |
| Reagent (1) | benzylidene stearylamine and acetyl chloride | N-hydroxymethyl benzamide |  | |
| Reagent (2) | titanium tetrachloride | tin tetrachloride | pyridine | triethylamine |
| Reagent (3) | — | p-toluenesulfonic acid | dimethyl sulfate | chloromethyl ether |

Note
*2 Nk ester-23G, n = 23, a product of Shin-Nakamura Chemical K.K.
*3 CHEMLINK 4500B, molecular weight 13,000, a product of Somar Corp.
Mw: Weight average molecular weight determined by GPC.

Examples 1 through 6 and Comparative Examples 1 through 3

A magnetic coating composition for forming a magnetic layer was prepared according to the following recipe:

| | |
|---|---|
| Co-containing γ-Fe₂O₃ magnetic powder (coersive force = 720 Oe, BET specific surface area = 42 m²/g) | 100 parts |
| Vinyl chloride resin (shown in Table 3) | 12 parts |
| Dispersant (shown in Table 3) | 3 parts |
| α-Al₂O₃ (particle diameter = 0.3 μm) | 5 parts |
| Carbon black | 5 parts |
| Methyl ethyl ketone/cyclohexanone/toluene (2/1/1) mixed solvent | 140 parts |

The above composition was mixed and dispersed for 48 hours in a ball mill. A mixture comprising the following components were added to the above composition:

| | |
|---|---|
| Polyurethane elastomer | 8 parts |

TABLE 3

| | Example No. | | | | | | | | | Comparative Example No. | | |
|---|---|---|---|---|---|---|---|---|---|---|---|---|
| | 1 | 2 | 3 | 4 | 5 | 6 | 7 | 8 | 9 | 1 | 2 | 3 |
| Run No. | 1 | 2 | 3 | 4 | 5 | 6 | 7 | 8 | 9 | 10 | 11 | 12 |
| Vinyl chloride resin | VAGH*⁴ | VAGH | VAGH | VAGH | VAGH | VAGH | VAGH | MR-110*⁵ | VAGH | VAGH | VAGH | VAGH |
| Dispersant | A | B | C | D | E | F | G | B | B*⁶ | myristic acid | lecithin | — |
| Polyurethane elastomer | (I)*⁷ | (I) | (I) | (II)*⁸ | (II) | (II) | (II) | (II) | (I) | (I) | (I) | (I) |
| Dispersion stability of coating solution | 0.98 | 0.97 | 0.97 | 0.99 | 1.00 | 0.97 | 0.98 | 0.97 | 0.98 | 0.16 | 0.28 | 0.52 |
| Characteristics of tape | | | | | | | | | | | | |
| Bm (glass) | 1720 | 1700 | 1750 | 1750 | 1730 | 1780 | 1750 | 1800 | 1780 | 1480 | 1520 | 1400 |
| Br/Bm | 0.86 | 0.85 | 0.86 | 0.86 | 0.86 | 0.89 | 0.87 | 0.88 | 0.86 | 0.78 | 0.79 | 0.74 |
| Running frequency | above 200 | above 200 | above 200 | above 200 | above 200 | above 200 | above 200 | above 200 | above 200 | 60 | 60 | 60 |

Note
*⁴product supplied by UCC
*⁵product supplied by Nippon Zeon
*⁶magnetic powder was preliminarily treated with dispersant B
*⁷polyester polyurethane composed of polybutylene adipate/4,4'-diphenylmethane diisocyanate/1,4-butanediol/trimethylol propane, having Mw of 50,000 and hydroxyl group content of 0.2%
*⁸polycarbonate polyurethane composed of hexamethylene carbonate/4,4'-diphenylmethane diisocyanate/1,4-butanediol/trimethylol propane, having Mw of 60,000 and hydroxyl group content of 0.2%

| (shown in Table 3) | |
|---|---|
| Myristic acid | 1 part |
| n-Butyl stearate | 1 part |
| Above-mentioned mixed solvent | 32 parts |

The composition was further mixed and dispersed for 4 hours to obtain a magnetic coating solution. A part of the formed paint was sampled in a glass bottle, and 4 parts of Desmodur L-75 (trifunctional isocyanate compound supplied by Bayer) to remaining 245 parts of the coating solution and the mixture was dispersed for 30 minutes by a high-speed disperser and passed through a membrane filter (supplied by millipore) to form a magnetic coating solution. The formed magnetic paint was coated on a polyester film having a thickness of 14 μm so that the thickness of the dry coating was 4 μm, and the orientation and drying treatments were carried out to form a magnetic layer. Mirror finish was effected by the calender treatment. Then, crosslinking was carried out at 60° C. for 24 hours and the coated film was cut to a predetermined width to prepare a video tape.

Separately, the coating solution sampled before the addition of Desmodur L-75 was coated on a polyester film so that the thickness of the dry coating was 4 μm, and the orientation and drying treatments were carried out and the gloss of the coating was measured. The coating solution was allowed to stand for 24 hours, and a coating was similarly formed and the gloss was measured. The dispersion stability of the coating solution was determined based on the difference of the gloss (gloss after 24 hours/initial gloss).

With respect to each of the video tapes obtained in the examples and comparative examples, the saturation flux density (Bm) and the squareness ratio Br/Bm (Br: residual flux density) were measured at 10 kOe by using VSM supplied by Toei Kogyo. Furthermore, the durability was measured. The results are shown in Table 3.

Note, the durability was evaluated in the following manner. Namely, a video tape having a length of 100 m was assembled in a VSH type cassette and the cassette was inserted to a video tape recorder. A signal of 4 MHz was put into the video tape recorder to run the tape. When the output was reduced by 4 dB from the initial value, the running frequently from the start was measured. The durability was evaluated based on this running frequency.

In Example 9 in Table 3, first, 100 parts of the magnetic powder was incorporated into 500 parts of a 0.5% solution of dispersant B in toluene, and the liquid was then mixed and filtered. The recovered solid was dried and the obtained powder was used as the magnetic powder.

As apparent from the results shown in Table 3, the video tape of the present invention comprising a magnetic layer containing the dispersant of the present invention or a magnetic powder pretreated with the dispersant of the present invention has much higher magnetic characteristics, for example, much higher saturation flux density (Bm), squareness ratio (Br/Bm), and residual flux density, than those of a tape not containing the dispersant (Comparative Example 3) or a tape formed by using a conventional dispersant, and has excellent electro-magnetic conversion characteristics based on these magnetic characteristics. Moreover, the tape of the present invention has an excellent durability over other tapes not comprising the dispersant of the present invention (Comparative Examples 1 through 3).

Examples 10 through 12 and Comparative Examples 4 and 5

By using dispersants B, C and D of the present invention in Examples 10, 11 and 12, respectively, coating solutions for the backcoat layer were prepared according to the following recipe:

| Carbon black | 100 parts |
|---|---|
| Nitrocellulose | 40 parts |
| Dispersant | 40 parts |
| Methyl ethyl ketone | 320 parts |
| Toluene | 240 parts |
| Cyclohexane | 160 parts |

The above composition was mixed and dispersed for 48 hours in a ball mill, and 10 parts of curing agent Desmodur L-75 (trifunctional isocyanate compound supplied by Bayer) was added to the dispersion. The formed coating solution was coated on the surface of the polyester film of Example 5 in Table 3 on the side opposite to the surface on which the coating composition for the magnetic layer was coated, so that the thickness of the dry coating was 1 μm. The coated film was dried at 60° C. for 24 hours, and then cut to a predetermined width to form a video tape.

For comparison, a sample tape was prepared by using oleyl alcohol instead of the dispersant of the present invention, when preparing the coating composition for the backcoat layer in Comparative Example 4, and another sample tape was prepared without using a dispersant in Comparative Example 5.

With respect to each of the obtained tapes, a falling of the powder from the backcoat layer and the scratch resistance were measured.

More specifically, after 100 runnings of a 60-minute shuttle, the amount of the powder falling on the head drum, the guide and the other parts was checked with the naked eye and the powder falling property was evaluated according to the demerit mark method. A larger absolute value indicates a larger amount of the falling powder.

Furthermore, after 100 runnings of a 60-minute shuttle, the scratch of the sample tape having a 10-minute length was observed with the naked eye. Mark "A" indicates a very good state, mark "B" indicates a good state, mark "C" indicates a slight scratch, and mark "D" indicates a serious scratch and a conspicuous powder falling.

The obtained results are shown in Table 4.

Examples 13 and 14 and Comparative Examples 6 and 7

The procedures of Examples 10 through 12 were repeated in the same manner except that a phenoxy resin was used instead of nitrocellulose and the dispersant was changed to the dispersants F and G (in Examples 13 and 14, respectively) in the coating solutions for the backcoat layer, and the obtained tapes were evaluated in the same manner as described in Examples 10 through 12. The results are shown in Table 4.

In Example 14, 100 parts of carbon black was incorporated into 500 parts by weight of a 0.5% solution of dispersant G in toluene, and the liquid mixture was filtered and the recovered solid was dried. The thus-treated carbon black was used.

For comparison, the starting materials of the dispersants F and G were directly used in Comparative Examples 6 and 7, respectively, and the obtained tapes were similarly evaluated.

As apparent from the results shown in Table 4, a compound having an oxazine structure is used as the dispersant and/or binder of the backcoat layer, and the powder falling resistance and the scratch resistance are highly improved, compared with the case where a dispersant not having of the oxazine structure is used.

TABLE 4

| | Example No. | | | Comparative Example No. | | Example No. | | Comparative Example No. | |
|---|---|---|---|---|---|---|---|---|---|
| | 10 | 11 | 12 | 4 | 5 | 13 | 14 | 6 | 7 |
| Run No. | 13 | 14 | 15 | 16 | 17 | 18 | 19 | 20 | 21 |
| Dispersant | B | C | D | oleyl alcohol | not added | F | G*9 | Starting material of dispersant F | Starting material of dispersant G |
| Powder falling (%) | −0.5 | −0.5 | −0.5 | −3.0 | −4.0 | −0.5 | −0.5 | −5.0 | −5.0 |
| Scratch resistance | B | A | C | D | D | B | A | D | D |

Note
*9 Carbon black was treated with dispersant G and the magnetic coating solution was made using the thus-treated carbon black.

We claim:

1. A magnetic recording medium which comprises a non-magnetic support and, formed thereon, a magnetic layer comprising a ferromagnetic powder and a binder, wherein the magnetic layer contains at least 0.1 part by weight, per 100 parts by weight of the ferromagnetic powder, of a dispersant compound or polymer having at least one $>C=N^\oplus<$ bond in the molecule of the formula

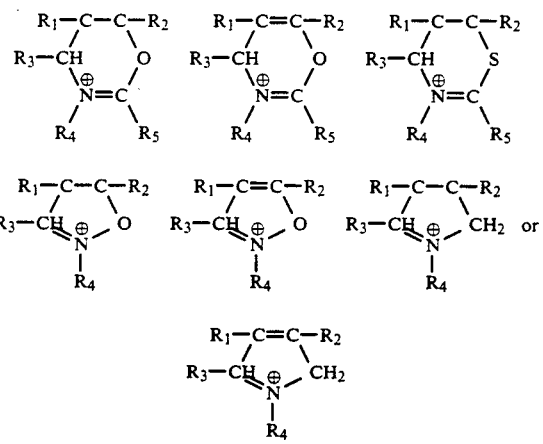

wherein $R_1$ and $R_2$ in the compound represent a hydrogen atom or a hydrocarbon group having not more than 6 carbon atoms, and in the polymer are hydrocarbon groups taken together to form the main chain of the polymer; $R_3$, $R_4$ and $R_5$ may be the same or different and each represents a hydrocarbon group optionally substituted by a halogen atom, a nitro group, an epoxy group, a carboxyl group or a hydroxyether group.

2. A magnetic recording medium according to claim 1, wherein the ferromagnetic powder is preliminarily treated with the compound having at least one $>C=N^\oplus<$ bond in the molecule.

3. A magnetic recording medium according to claim 1, wherein the compound or polymer having at least one $>C=N^{\oplus}<$ bond in the molecule is contained in an amount of 0.5 to 30 parts by weight per 100 parts by weight of the ferromagnetic powder in the magnetic layer.

4. A magnetic recording medium according to claim 1, wherein the compound having at least one $>C=N^{\oplus}<$ bond in the molecule has a molecular weight of less than 1,000 and is contained in an amount of 0.5 to 5 parts by weight per 100 parts by weight of the ferromagnetic powder in the magnetic layer.

5. A magnetic recording medium according to claim 1, wherein the polymer having at least one $>C=N^{\oplus}<$ bond in the molecule has a molecular weight of at least 10,000 and is contained in an amount of 5 to 30 parts by weight per 100 parts by weight of the ferromagnetic powder in the magnetic layer.

6. A magnetic recording medium which comprises a non-magnetic support, a magnetic layer comprising a ferromagnetic powder and a binder on one surface of the support, and a backcoat layer comprising a non-magnetic powder and a binder on the other surface of the support, wherein at least one of the magnetic layer and the backcoat layer contains at least 0.1 part by weight, per 100 parts by weight of the ferromagnetic powder, of a dispersant compound or polymer having at least one $>C=N^{\oplus}<$ bond in the molecule of the formula

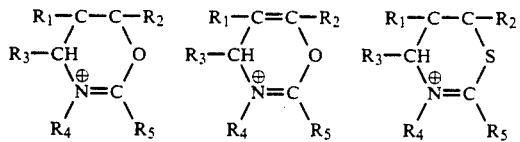

-continued

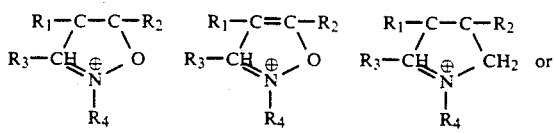

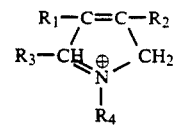

wherein $R_1$ and $R_2$ in the compound represent a hydrogen atom or a hydrocarbon group having not more than 6 carbon atoms, and in the polymer are hydrocarbon groups taken together to form the main chain of the polymer; $R_3$, $R_4$ and $R_5$ may be the same or different and each represents a hydrocarbon group optionally substituted by a halogen atom, a nitro group, an epoxy group, a carboxyl group or a hydroxyether group.

7. A magnetic recording medium according to claim 6, wherein at least one of the ferromagnetic powder and the non-magnetic powder is preliminarily treated with the compound having at least one $>C=N^{\oplus}<$ bond in the molecule.

8. A magnetic recording medium according to claim 6, wherein the compound or polymer having at least one $>C=N^{\oplus}<$ bond in the molecule is contained in an amount of 0.5 to 30 parts by weight per 100 parts by weight of the ferromagnetic powder.

9. A magnetic recording medium according to claim 6, wherein the compound having at least one $>C=N^{\oplus}<$ bond in the molecule has a molecular weight of less than 1,000 and is contained in an amount of 0.5 to 5 parts by weight per 100 parts by weight of the ferromagnetic powder.

10. A magnetic recording medium according to claim 6, wherein the polymer having at least one $>C=N^{\oplus}<$ bond in the molecule has a molecular weight of at least 10,000 and is contained in an amount of 5 to 30 parts by weight per 100 parts by weight of the ferromagnetic powder.

* * * * *